(12) United States Patent
Takahashi et al.

(10) Patent No.: US 7,029,833 B2
(45) Date of Patent: Apr. 18, 2006

(54) IMAGE DISPLAY MEDIUM, PROCESS FOR FORMING IMAGE, AND MULTICOLOR IMAGE-FORMING APPARATUS

(75) Inventors: Hiroyuki Takahashi, Kanagawa (JP); Shigenobu Hirano, Kanagawa (JP); Ikue Kawashima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 237 days.

(21) Appl. No.: 10/364,494

(22) Filed: Feb. 11, 2003

(65) Prior Publication Data

US 2003/0184644 A1    Oct. 2, 2003

(30) Foreign Application Priority Data

Feb. 15, 2002  (JP)  .............................. 2002-037944
Apr. 19, 2002  (JP)  .............................. 2002-117934

(51) Int. Cl.
*G03F 1/73*  (2006.01)

(52) U.S. Cl. .................. 430/333; 430/19; 430/334; 430/335; 430/339; 430/962

(58) Field of Classification Search ................ 430/19, 430/332, 333, 334, 335, 338, 339, 340, 344, 430/962

See application file for complete search history.

(56) References Cited

U.S. PATENT DOCUMENTS

| | | | |
|---|---|---|---|
| 4,686,169 A | 8/1987 | Yoshino et al. | |
| 4,803,287 A | 2/1989 | Hibino et al. | |
| 4,845,240 A | 7/1989 | Hibino et al. | |
| 4,913,948 A | * 4/1990 | Ando et al. ................. 428/64.8 |
| 4,960,679 A | * 10/1990 | Nakagiri et al. ............ 430/335 |
| 5,079,061 A | 1/1992 | Hashida et al. | |
| 5,296,439 A | 3/1994 | Maruyama et al. | |
| 5,359,085 A | 10/1994 | Iwamoto et al. | |
| 5,399,451 A | 3/1995 | Hashida et al. | |
| 5,408,344 A | 4/1995 | Takiguchi et al. | |
| 5,623,476 A | 4/1997 | Eguchi et al. | |
| 5,644,416 A | 7/1997 | Morikawa et al. | |

(Continued)

FOREIGN PATENT DOCUMENTS

| | | |
|---|---|---|
| EP | 0230024 A2 | 7/1987 |
| EP | 0 657 773 A  * | 6/1995 |

(Continued)

OTHER PUBLICATIONS

U.S. Appl. No. 08/827,798 of Takiguchi et al., filed Apr. 11, 1997.

*Primary Examiner*—John A. McPherson
(74) *Attorney, Agent, or Firm*—Cooper & Dunham LLP

(57) ABSTRACT

An image display medium that includes a photoconductive layer containing a photochromic compound and an electron accepting compound; and a substrate, in which the photochromic compound contains a fulgide compound, and the electron accepting compound contains a compound selected at least from: a) a phosphonic acid compound having an aliphatic group containing 12 or more carbon atoms; b) an aliphatic carboxylic acid compound having an aliphatic group containing 12 or more carbon atoms; and c) a phenolic compound having an aliphatic group containing 12 or more carbon atoms, a process for forming an image using the medium, and a multicolor image-forming apparatus using the medium and suitable for the process.

12 Claims, 6 Drawing Sheets

U.S. PATENT DOCUMENTS

| | | |
|---|---|---|
| 6,061,042 A | 5/2000 | Takahashi et al. |
| 6,151,093 A | 11/2000 | Takiguchi et al. |
| 6,320,571 B1 | 11/2001 | Takahashi et al. |
| 2004/0063006 A1* | 4/2004 | Takahashi et al. ............ 430/19 |

FOREIGN PATENT DOCUMENTS

| | | |
|---|---|---|
| JP | 7-120922 | 5/1995 |
| JP | 10020430 A * | 1/1998 |

* cited by examiner

IMAGE DISPLAY MEDIUM, PROCESS FOR FORMING IMAGE, AND MULTICOLOR IMAGE-FORMING APPARATUS

BACKGROUND OF THE INVENTION

1. Field of the Invention

The present invention relates to an image display medium, a process for forming images, and a multicolor image-forming apparatus. More specifically, it relates to an image display medium, a process for forming images, and a multicolor image-forming apparatus that can repeatedly form color images upon light irradiation.

2. Description of the Related Art

Erasable or rewritable image display media using photochromic compounds that can reversibly change their colors upon irradiation with light have been proposed. However, practical processes and apparatus that can repeatedly rewrite full-color images have not yet been proposed.

For example, Japanese Patent Application Laid-Open (JP-A) No. 05-271649 discloses, as a process for forming multicolor images using a photochromic compound, a process of applying ultraviolet radiation with distinct corresponding wavelengths to a mixture of three diarylethenes, where the diarylethenes include one turning golden yellow upon irradiation with ultraviolet radiation wavelength of 254 nm, one turning red upon irradiation with ultraviolet radiation wavelength of 313 nm, and one turning bluish purple (violet) upon irradiation with ultraviolet radiation wavelength of 365 nm.

To form full-color images, three or more photochromic compounds developing three primary colors (blue, green, and red, or yellow, magenta, and cyan) must be controlled by light to develop and/or reduce their colors. The aforementioned process requires that wavelengths of the ultraviolet radiation determine whether or not each of the material compounds develops its color. In other words, the process requires three or more photochromic compounds showing absorption in ultraviolet wavelengths, where each of the wavelengths does not overlap one another, and that these photochromic compounds show the three primary colors upon color development. However, no compounds comprising such compounds has been found in reality. To use in practice, materials must have satisfactory repetition durability, heat and moisture resistance in addition to color developing properties. Such materials satisfying all the requirements are very difficult to develop.

Japanese Patent Application Laid-Open (JP-A) No. 07-199401 proposes a process for forming color images. In this process, ultraviolet radiation of 366 nm is applied to three photochromic fulgide compounds turning yellow, magenta, and cyan upon color development, respectively, to thereby make all the fulgide compounds to develop their colors. White light is then applied to the fulgide compounds through a color positive film to selectively reduce the colors of individual photochromic fulgide compounds according to necessity to thereby form color images. This process only requires one ultraviolet light source, but requires a preparation of a color positive film of the target image upon each use and is not practical for use in color image output in office systems.

These and other proposals for rewritable image media and processes using photochromic compounds are not satisfactorily practical in the formation of color images.

SUMMARY OF THE INVENTION

Accordingly, an object of the present invention is to provide an image display medium rewritable upon irradiation with light and a process for forming images using the same, which can shorten a time period for image formation and can improve persistence of colors of formed images. Another object of the present invention is to provide an image display medium and a process for forming images which can give high-definition and high-quality color images.

A further object of the present invention is to provide high-definition and high-quality multicolor image-forming apparatus, which is capable of controlling decolorization sensitivity of an image display medium rewritable upon irradiation with light and is capable of shortening the time period for image formation and of improving persistence of coloring stability of formed images. More specifically, the further object of the present invention is to provide a multicolor image-forming apparatus, which can switch the magnitude of the decolorization sensitivity in a decolorizing process in the formation of images.

Specifically, the present invention provides, in a first aspect, an image display medium which comprises a photoconductive layer containing a photochromic compound and an electron accepting compound, and a substrate, in which the photochromic compound contains a fulgide compound, and the electron accepting compound contains a compound selected at least from a) a phosphoric acid compound having an aliphatic group containing 12 or more carbon atoms, b) an aliphatic carboxylic acid compound having an aliphatic group containing 12 or more carbon atoms, and c) a phenol compound having an aliphatic group containing 12 or more carbon atoms.

By including the fulgide compound as the photochromic compound and the specific electron accepting compound in the photoconductive layer, the present invention can provide a rewritable image display medium that can reversibly change the decolorization sensitivity, can shorten the image forming time period and can improve persistence of coloring stability of formed images.

According to a second aspect of the present invention, the electron-accepting compound may be a phosphoric acid compound represented by the following Formula (I):

where $R^1$ is an aliphatic, group containing 12 or more carbon atoms.

According to a third aspect of the present invention, the electron accepting compound may be an alpha-hydroxyalphaticcarboxylic acid compound represented by the following Formula (II):

where $R^2$ is an aliphatic group containing 12 or more carbon atoms.

According to a fourth aspect of the present invention, the electron accepting compound may be an aliphatic carboxylic acid compound containing 12 or more carbon atoms, and at least one of the carbon atoms is bonded to a halogen element at one of an alpha-position and a beta-position of the aliphatic carboxylic acid compound.

According to a fifth aspect of the present invention, the electron accepting compound may be an aliphatic carboxylic acid compound containing 12 or more carbon atoms, and the aliphatic carboxylic acid compound has at least one oxo group at any one of an alpha-position, a beta-position, and a gamma-position thereof.

According to a sixth aspect of the present invention, the electron accepting compound may be an aliphatic carboxylic acid compound represented by the following Formula (III):

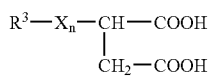

Formula (III)

where $R^3$ is an aliphatic group containing 12 or more carbon atoms; "X" is one of an oxygen atom and a sulfur atom; and "n" is 1 when "X" is an oxygen atom, and "n" is one of 1 and 2 when "X" is a sulfur atom.

According to a seventh aspect of the present invention, the electron accepting compound may be an aliphatic carboxylic acid compound represented by the following Formula (IV):

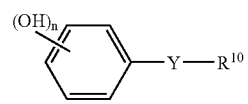

Formula (IV)

where $R^4$, $R^5$, and $R^6$ are identical or different, and each express one of a hydrogen atom and an aliphatic group, in which at least one of $R^4$, $R^5$, and $R^6$ is an aliphatic group containing 12 or more carbon atoms.

According to an eighth aspect of the present invention, the electron accepting compound may be an aliphatic carboxylic acid compound represented by the following Formula (V):

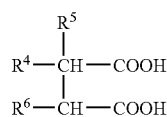

Formula (V)

where $R^7$ and $R^8$ are identical or different, and each express one of a hydrogen atom and an aliphatic group, in which at least one of $R^7$ and $R^8$ is an aliphatic group containing 12 or more carbon atoms.

According to a ninth aspect of the present invention, the electron accepting compound may be an aliphatic carboxylic acid compound represented by the following Formula (VI):

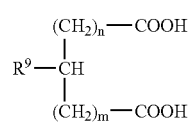

Formula (VI)

where $R^9$ is an aliphatic group containing 12 or more carbon atoms; "n" is 0 or 1; and "m" is an integer from 1 to 3, in which "m" is 2 or 3 when "n" is 0, and "m" is 1 or 2 when "n" is 1.

According to a tenth aspect of the present invention, the electron accepting compound may be a phenolic compound represented by the following Formula (VII):

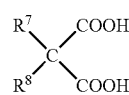

Formula (VII)

where $R^{10}$ is an aliphatic group containing 12 or more carbon atoms; "Y" is one of S, O, CONH, and COO; and "n" is an integer from 1 to 3.

According to an eleventh aspect of the present invention, the photochromic compound may contain two or more fulgide compounds having different maximum absorption wavelengths, when the photochromic compound is colored.

According to a twelfth aspect of the present invention, two or more of the fulgide compounds may contain a fulgide compound (A) having a maximum absorption wavelength of 400 nm or more and less than 500 nm, when the photochromic compound is colored; a fulgide compound (B) having a maximum absorption wavelength of 500 nm or more and less than 600 nm, when the photochromic compound is colored; and a fulgide compound (C) having a maximum absorption wavelength of 600 nm or more and less than 700 nm, when the photochromic compound is colored.

According to a thirteenth aspect of the present invention, the photoconductive layer may have a plurality of layers, and each of the layers may have fulgide compounds having different maximum absorption wavelengths, when the photochromic compound is colored.

According to a fourteenth aspect of the present invention, the fulgide compounds having different maximum absorption wavelengths when the photochromic compound is colored may contain a fulgide compound (A) having a maximum absorption wavelength of 400 nm or more and less than 500 nm when the photochromic compound is colored; a fulgide compound (B) having a maximum absorption wavelength of 500 nm or more and less than 600 nm when the photochromic compound is colored; and a fulgide compound (C) having a maximum absorption wavelength of 600 nm or more and less than 700 nm when the photochromic compound is colored.

According to a fifteenth aspect of the present invention, the photoconductive layer may further have an intermediate layer between a plurality of the layers.

According to a sixteenth aspect of the present invention, the image display medium may further comprise a protecting layer on a surface of the photoconductive layer.

The present invention provide, in a seventeenth aspect, a process for forming an image which comprises the steps of;

irradiating ultraviolet radiation to an image display medium so as to color all types of photochromic compounds contained in a photoconductive layer; heating the image display medium to a melting point of an electron accepting compound or higher; irradiating visible radiation to a desired portion of the image display medium at a wavelength corresponding to the maximum absorption wavelength of each of the photochromic compounds, so as to selectively decolorize the photochromic compounds; and heating the image display medium to the melting point of the electron accepting compound or lower, in which the image display medium comprises a photoconductive layer containing a photochromic compound and an electron accepting compound; and a substrate, where the photochromic compound contains a fulgide compound, and the electron accepting compound contains a compound selected at least from a) a phosphonic acid compound having an aliphatic group containing 12 or more carbon atoms; b) an aliphatic carboxylic acid compound having an aliphatic group containing 12 or more carbon atoms; and c) a phenolic compound having an aliphatic group containing 12 or more carbon atoms.

By using the image display medium containing the photochromic fulgide compound and the specific electron accepting compound in the photoconductive layer and by including heating steps for reversibly changing the decolorization sensitivity, the present invention can provide a process for forming rewritable multicolor images upon light irradiation, in which the process enables shorter time period for forming an image and also enables improving persistence of developed colors of formed images.

According to an eighteenth aspect of the present invention, the image display medium is heated at a melting point of the fulgide compound or higher, in the step of heating the image display medium to a melting point of an electron accepting compound or higher.

According to a nineteenth aspect of the present invention, the process may further comprise a step of rapidly cooling the image display medium, after the step of heating the image display medium to a melting point of an electron accepting compound or higher.

The present invention provides, in a twentieth aspect, a multicolor image-forming apparatus which comprise an ultraviolet radiation irradiator configured to irradiate ultraviolet radiation to the image display medium of the present invention so as to color all types of photochromic compounds in a photoconductive layer; a first heater configured to temporarily heat the image display medium; a visible radiation irradiator configured to irradiate visible radiation to a desired portion of the image display medium, at a wavelength corresponding to the maximum absorption wavelength of the photochromic compounds in a state of colored, so as to selectively decolorize the photochromic compounds; and a second heater configured to temporarily heat the image display medium after irradiating the visible radiation, in which the image display medium repeatedly forms a multicolor image.

The apparatus can control the decolorization sensitivity, can shorten the image forming time period and can ensure satisfactory persistence of developed colors of formed images.

According to a twenty first aspect of the present invention, the multicolor image-forming apparatus may further comprise a transfer configured to transfer the image display medium, in which the image display medium relatively moves towards the ultraviolet radiation irradiator, the first heater, the visible radiation irradiator, and the second heater, in this order.

By these configurations, the multicolor image-forming apparatus can automatically move the image display medium inside the apparatus which includes an ultraviolet radiation irradiator, the first heater, the visible radiation irradiator, and the second heater. The multicolor image-forming apparatus can also control or change the position of the image display medium as required at each of the heaters and the irradiators, and thereby has much improved operability.

According to a twenty second aspect of the present invention, the multicolor image-forming apparatus may further comprise an inlet and an outlet, in which the image display medium is inserted from the inlet, the image display medium is automatically transferred inside the multicolor image-forming apparatus, and the image display medium is ejected from the outlet.

By these configurations, the multicolor image-forming apparatus enables improving the usage, and can have highly improved abilities at each of the steps.

The present invention further provides, in a twenty third aspect, a multicolor image forming apparatus which comprises an ultraviolet radiation irradiator configured to irradiate ultraviolet radiation to the image display medium of the present invention so as to color all types of photochromic compounds contained in a photoconductive layer; a visible radiation irradiator configured to irradiate visible radiation to a desired portion of the image display medium, at a wavelength corresponding to the maximum absorption wavelength of the photochromic compounds in a state of colored, so as to selectively decolorize the photochromic compounds, when the photochromic compounds are colored; and a heater configured to temporarily heat the image display medium, where the image display medium repeatedly forms a multicolor image, and the heater heats the image medium both before and after irradiating visible radiation, after irradiating ultraviolet radiation.

According to a twenty fourth aspect of the present invention, the multicolor image-forming apparatus may further comprise a transfer configured to transfer the image display medium, where the image display medium relatively moves towards the ultraviolet radiation irradiator, the heater, and the visible radiation irradiator, in this order, and, the image display medium moves back to the heater.

According to a twenty fifth aspect of the present invention, the multicolor image-forming apparatus may further comprise an inlet/outlet port which works as an inlet to insert an image display medium and as an outlet to eject the image display medium, in which the image display medium is automatically transferred from the inlet/outlet to inside the multicolor image-forming apparatus, and the image display medium is ejected from the inlet/outlet.

According to a twenty sixth aspect of the present invention, the multicolor image-forming apparatus may further comprise a visible radiation irradiator configured to irradiate white light to the image display medium so as to decolorize an entire portion of the image display medium.

The twenty sixth aspect provides a multicolor image-forming apparatus which can entirely decolorize the image display medium in a short period of time, when requested.

Figure 1A:
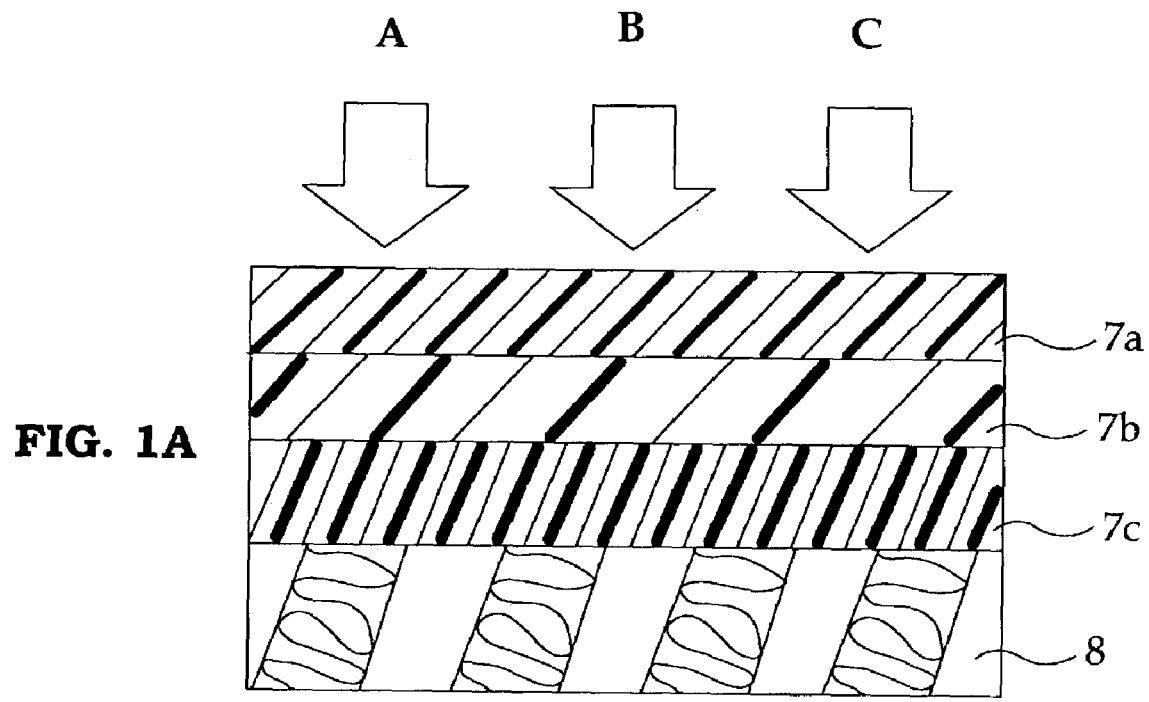
FIGS. 1A and 1B are schematic views showing an example of forming an image by light irradiation.

DESCRIPTION OF THE PREFERRED EMBODIMENTS (Image Display Media and Processes for Forming Images)

The image display medium of the present invention is an image display medium comprising a photoconductive layer containing at least one photochromic compound and at least one electron accepting compound disposed on a substrate, in which the photochromic compound is at least one fulgide compound, and the electron accepting compound is at least one selected from phosphonic acid compounds, aliphatic carboxylic acid compounds, and phenolic compounds each having an aliphatic group containing 12 or more carbon atoms.

The fulgide compounds used in the present invention include fulgide compounds represented by following Formula (VIII) and Formula (IX):

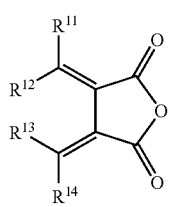

Formula (VIII)

wherein $R^{11}$, $R^{12}$, $R^{13}$, and $R^{14}$ are identical or different and are each one of a hydrogen atom, alkyl groups, alkoxy groups, aromatic rings, and heteroaromatic rings, where at least one of $R^{11}$, $R^{12}$, $R^{13}$, and $R^{14}$ structurally includes an aromatic ring or a heteroaromatic ring, fulgide compounds represented by following Formula (IX):

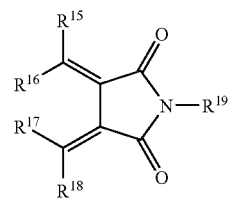

Formula (IX)

wherein $R^{15}$, $R^{16}$, $R^{17}$, $R^{18}$, and $R^{19}$ are identical or different and are each one of a hydrogen atom, alkyl groups, alkoxy groups, aromatic rings, and heteroaromatic rings, where at least one of $R^{15}$, $R^{16}$, $R^{17}$, $R^{18}$, and $R^{19}$ structurally includes an aromatic ring or a heteroaromatic ring, and other compounds that structurally include these compounds and show photochromism.

The decolorization sensitivity of fulgide compounds will be described below.

The decolorization sensitivity directly depends on quantum efficiency ($\phi$CE) in a decolorizing reaction of a photochromic compound, and control of the decolorization sensitivity of a compound substantially means control of $\phi$CE of the compound. Hereinafter, changes in decolorization sensitivity mean changes in $\phi$CE of the compound in question.

The decolorization sensitivity of such a fulgide compound represented by Formula (VIII) or (IX) generally significantly depends on electronic properties (electron donating property or electron accepting property) due to the chemical structure of an aromatic ring moiety of the compound. For example, a compound having an aromatic ring with high electron donating property has a low decolorization sensitivity, and one having an aromatic ring with low electron donating property has a high decolorization sensitivity.

The decolorization sensitivity of a compound can also vary depending on electronic properties of a medium surrounding the compound. In other words, the electronic properties of the aromatic ring moiety of the fulgide compound apparently vary by the interaction between the compound and the medium. When the interaction between an electron accepting compound in a medium and the fulgide compound is large, the electron donating property of the aromatic ring moiety decreases, to thereby increase the decolorization sensitivity. In contrast, when the interaction is small, the electron donating property of the aromatic ring moiety increase to thereby decrease the decolorization sensitivity. Accordingly, the decolorization sensitivity of a fulgide compound can be controlled by controlling the interaction between the fulgide compound and an electron accepting compound used in combination.

Such electron accepting compounds for use in the present invention are compounds that can change the electronic properties of an aromatic ring moiety of a fulgide compound and are selected from the group consisting of phosphonic acid compounds, carboxylic acid compounds, and phenolic compounds. These compounds should each have an aliphatic chain structure (group) containing 12 or more carbon atoms to control intermolecular cohesion of the electron accepting compound. Such aliphatic groups include straight- or branched-chain alkyl groups and alkenyl groups, each of which may have at least one substituent such as halogen atoms, alkoxy groups, ester groups, or the like.

Examples of the electron accepting compounds are as follows.

The phosphonic acid compounds represented by Formula (I) include, but are not limited to, dodecylphosphonic acid, tetradecylphosphonic acid, hexadecylphosphonic acid, octadecylphosphonic acid, eicosylphosphonic acid, docosylphosphonic acid, tetracosylphosphonic acid, hexacosylphosphonic acid, octacosylphosphonic acid, and the like.

The aliphatic alpha-hydroxycarboxylic acid compounds represented by Formula (II) include, but are not limited to, alpha-hydroxydodecanoic acid, alpha-hydroxytetradecanoic acid, alpha-hydroxyhexadecanoic acid, alpha-hydroxyoctadecanoic acid, alpha-hydroxypentadecanoic acid, alpha-hydroxyeicosanic acid, alpha-hydroxydocosanoic acid, alpha-hydroxytetracosanoic acid, alpha-hydroxyhexacosanoic acid, alpha-hydroxyoctacosanoic acid, and the like.

The aliphatic carboxylic acid compounds each containing 12 or more carbon atoms and having a halogen element bonded to at least one of carbon atoms at the alpha-position and the beta-position include, but are not limited to, 2-bromohexadecanoic acid, 2-bromoheptadecanoic acid, 2-bromooctadecanoic acid, 2-bromoeicosanic acid, 2-bromodocosanoic acid, 2-bromotetracosanoic acid, 3-bromooctadecanoic acid, 3-bromoeicosanic acid, 2,3-dibromooctadecanoic acid, 2-fluorododecanoic acid, 2-fluorotetradecanoic acid, 2-fluorohexadecanoic acid, 2-fluorooctadecanoic acid, 2-fluoroeicosanic acid, 2-fluorodocosanoic acid, 2-iodohexadecanoic acid, 2-iodooctadecanoic acid, 3-iodohexadecanoic acid, 3-iodooctadecanoic acid, perfluorooctadecanoic acid, and the like.

The aliphatic carboxylic acid compounds each containing 12 or more carbon atoms and having at least one oxo group bonded to at least one carbon atom at the alpha-position, the beta-position, or the gamma-position include, but are not limited to, 2-oxododecanoic acid, 2-oxotetradecanoic acid, 2-oxohexadecanoic acid, 2-oxooctadecanoic acid, 2-oxoeicosanic acid, 2-oxotetracosanoic acid, 3-oxododecanoic acid, 3-oxotetradecanoic acid, 3-oxohexadecanoic acid, 3-oxooctadecanoic acid, 3-oxoeicosanic acid, 3-oxotetracosanoic acid, 4-oxohexadecanoic acid, 4-oxooctadecanoic acid, 4-oxodocosanoic acid, and the like.

The aliphatic carboxylic acid compounds represented by Formula (III) include, but are not limited to, 2-(dodecyloxy)succinic acid, 2-(tetradecyloxy)succinic acid, 2-(hexadecyloxy)succinic acid, 2-(octadecyloxy)succinic acid, 2-(eicosyloxy)succinic acid, 2-(docosyloxy)succinic acid, 2-(tetracosyloxy)succinic acid, 2-(dodecylthio)succinic acid, 2-(tetradecylthio)succinic acid, 2-(hexadecylthio)succinic acid, 2-(octadecylthio)succinic acid, 2-(eicosylthio) succinic acid, 2-(docosylthio)succinic acid, 2-(tetracosylthio)succinic acid, 2-(dodecyldithio)succinic acid, 2-(tetradecyldithio)succinic acid, 2-(hexadecyldithio)succinic acid, 2-(octadecyldithio)succinic acid, 2-(eicosyldithio)succinic acid, 2-(docosyldithio)succinic acid, 2-(tetracosyldithio)succinic acid, and the like.

The aliphatic carboxylic acid compounds represented by Formula (IV) include, but are not limited to, dodecylsuccinic acid, tridecylsuccinic acid, tetradecylsuccinic acid, pentadecylsuccinic acid, octadecylsuccinic acid, eicosylsuccinic acid, docosylsuccinic acid, 2,3-dihexadecylsuccinic acid, 2,3-dioctadecylsuccinic acid, 2-methyl-3-dodecylsuccinic acid, 2-methyl-3-tetradecylsuccinic acid, 2-methyl-3-hexadecylsuccinic acid, 2-ethyl-3-dodecylsuccinic acid, 2-propyl-3-dodecylsuccinic acid, 2-octyl-3-hexadecylsuccinic acid, 2-tetradecyl-3-octadecylsuccinic acid, and the like.

The aliphatic carboxylic acid compounds represented by Formula (V) include, but are not limited to, dodecylmalonic acid, tetradecylmalonic acid, hexadecylmalonic acid, octadecylmalonic acid, eicosylmalonic acid, docosylmalonic acid, tetracosylmalonic acid, didodecylmalonic acid, ditetradecylmalonic acid, dihexadecylmalonic acid, dioctadecylmalonic acid, dieicosylmalonic acid, didocosylmalonic acid, methyloctadecylmalonic acid, methyleicosylmalonic acid, methyldocosylmalonic acid, methyltetracosylmalonic acid, ethyloctadecylmalonic acid, ethyleicosylmalonic acid, ethyldocosylmalonic acid, ethyltetracosylmalonic acid, and the like.

The aliphatic carboxylic acid compounds represented by Formula (VI) include, but are not limited to, 2-dodecylglutaric acid, 2-hexadecylglutaric acid, 2-octadecylglutaric acid, 2-eicosylglutaric acid, 2-docosylglutaric acid, 2-dodecyladipic acid, 2-pentadecyladipic acid, 2-octadecyladipic acid, 2-eicosyladipic acid, 2-docosyladipic acid, and the like.

The phenolic compounds represented by Formula (VII) include, but are not limited to, p-(dodecylthio)phenol, p-(tetradecylthio)phenol, p-(hexadecylthio)phenol, p-(octadecylthio)phenol, p-(eicosylthio)phenol, p-(docosylthio)phenol, p-(tetracosylthio)phenol, p-(dodecyloxy)phenol, p-(tetradecyloxy)phenol, p-(hexadecyloxy)phenol, p-(octadecyloxy)phenol, p-(eicosyloxy)phenol, p-(docosyloxy) phenol, p-(tetracosyloxy)phenol, p-dodecylcarbamoylphenol, p-tetradecylcarbamoylphenol, p-hexadecylcarbamoylphenol, p-octadecylcarbamoylphenol, p-eicosylcarbamoylphenol, p-docosylcarbamoylphenol, p-tetracosylcarbamoylphenol, hexadecyl ester gallate, octadecyl ester gallate, eicosyl ester gallate, docosyl ester gallate, tetracosyl ester gallate, and the like.

The photoconductive layer may further comprise a binder material according to necessity in addition to the fulgide compound and the electron accepting compound. The binder materials is preferably resinous materials that does not adversely affect the photochromic function of the fulgide compound, has satisfactory compatibility (miscibility) with the fulgide compound and the electron accepting compound, can form a film, and has satisfactory transparency after curing. Examples of the binder material include polystyrenes, polyesters, poly methylmethacrylate, vinyl chloride-vinylidene chloride copolymer, poly vinylchloride, poly vinylidenechloride, poly vinylacetate, and the like. The materials for the photoconductive layer also include phenoxy resins, aromatic polyesters, phenolic resins, epoxy resins, and the like.

Materials for the substrate include, but are not limited to, poly(ethylene terephthalate), poly(ether sulfone), polycarbonates, and other transparent materials, as well as white or other colored products of these materials, paper, and other opaque materials.

The proportions of the fulgide compound, the electron accepting compound, and the binder material in the photoconductive layer are not specifically limited and depend on combination of those compounds and the binder material. The photoconductive layer preferably has 5% to 30% of the fulgide compound, 20% to 80% of the electron accepting compound, and 20% to 50% of the binder material for preferable results.

The photoconductive layer can be formed by coating (applying), vapor deposition and other techniques. Of those, the preferred is coating, as it is simple. The photoconductive layer can be formed, for example, by dissolving the fulgide compound, the electron accepting compound, and, if necessary, the binder material in a solvent, by applying the solution with printing, spin coating, or another technique, and drying.

The process for forming images using the image display medium will be described below.

Ultraviolet radiation is applied to the image display medium to thereby cause the fulgide compound in the photoconductive layer to color. As a light source for the application of the ultraviolet radiation, a suitable combination of a mercury lamp or a xenon lamp with an optical filter can be employed, from which ultraviolet radiation of desired wavelengths is extracted. Alternatively, light-emitting diodes (LEDs), laser diodes (LDs), and other light-emitting devices each emitting radiation with a specific wavelength can be used.

The image display medium is then temporarily heated to a temperature (hereinafter, may be referred to as "Temperature I") equal to or higher than the melting point of the electron accepting compound. By this procedure, aliphatic group moieties of the electron accepting compound aggregate regularly to some extent, and acidic group moieties of the electron accepting compound closely interact with an aromatic ring moiety of the fulgide compound and are stabilized (hereinafter referred to as "State A"). Thus, the decolorization sensitivity of the fulgide compound increases.

In this state, visible radiation is applied to the image display medium in the decolorizing process. Light sources for the application of the visible radiation include lamps comprising a white light source and an optical filter in combination, and LEDs, LDs, and other light-emitting devices each emitting radiation with a specific wavelength. To irradiate a desired portion alone, for example, the image display medium is moved with respect to a light source array comprising small light-emitting units that can be On or Off in light emission and are continuously arrayed, and On/Off in light emission of the light-emitting units of the light source array is respectively controlled.

Thus, by subjecting the image display medium to the decolorizing process while the fulgide compound has an increased decolorization sensitivity, the color of the fulgide compound can be reduced with low energy, i.e., in a short time to thereby form an image.

Next, the image display medium is temporarily heated to a temperature (hereinafter may be referred to as "Temperature II") equal to or lower than the melting point of the electron accepting compound, and the acidic group moieties of the electron accepting compound closely aggregate with one another with less interaction with the aromatic ring moieties of the fulgide compound and are stabilized (hereinafter referred to as "State B"). This procedure may be performed by temporarily heating the image display medium to a temperature equal to or higher than the melting point of the electron accepting compound and gradually cooling the heated image display medium. Thus, the decolorization sensitivity of the fulgide compound decreases to avoid decolorization by, for example, illumination light to thereby improve persistence of coloring stability of formed images.

When the melting point of the fulgide compound is higher than that of the electron accepting compound, Temperature I may be the melting point of the electron accepting compound or higher, and is preferably equal to or higher than the melting point of the fulgide compound in the step of heating the image display medium to achieve State A.

After the completion of heating, the image display medium is preferably rapidly cooled. If it is gradually cooled, State A is more likely to become State B. This is because heating temperatures for achieving State B are lower than those for achieving State A. Accordingly, by heating the photoconductive layer in State A to specific temperatures, State B can be obtained.

Heating temperatures in the step of heating the image display medium to a melting point of the electron accepting compound or higher (which may be referred to as a "first heating step," hereinafter) to achieve State A, and in the step of heating the image display medium to lower than a melting point of the electron accepting compound (which may be referred to as a "second heating step," hereinafter) to achieve State B can be appropriately set depending on the types and combination of the fulgide compound, the electron accepting compound, and, the binder.

Image display media and processes for forming multi-color images will be described.

The image display medium for forming color images comprises a photoconductive layer disposed on a substrate, which photoconductive layer comprises two or more fulgide compounds and at least one electron accepting compound. The two or more fulgide compounds have different maximum absorption wavelengths when the fulgide compounds are colored, i.e., have different colors to be seen when the fulgide compounds are colored. The maximum absorption wavelengths and the types of the fulgide compounds may be set depending on colors to be displayed and the number thereof.

Figure 1B:
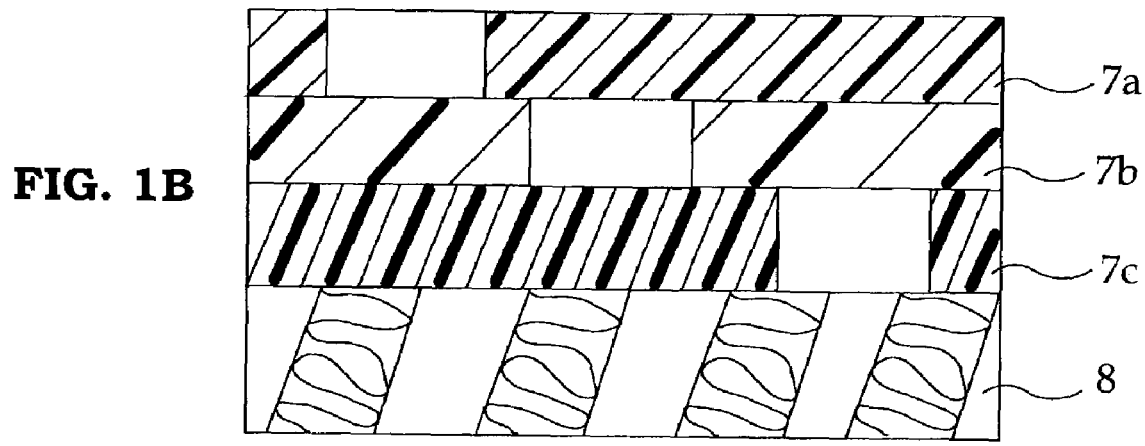
Figure 2:
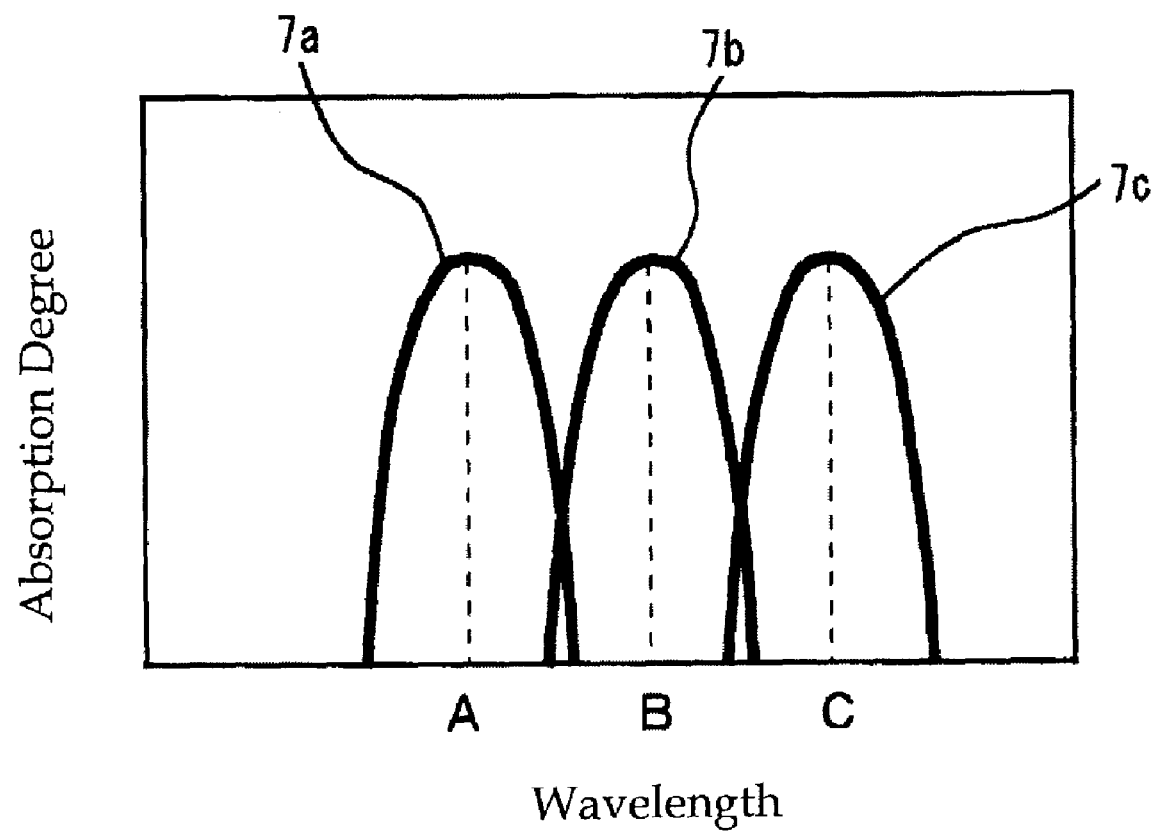
FIG. 2 is a graph schematically showing an example of absorption of fulgide compounds when the fulgide compounds are colored in the visible range of wavelengths.

FIGS. 1A and 1B are schematic views of image formation upon irradiation with light, by taking photoconductive layers comprising three fulgide compounds as an example. With reference to FIG. 1A, three photoconductive layers 7a, 7b, and 7c comprising different fulgide compounds are formed on a substrate 8. By applying ultraviolet radiation, all the three fulgide compounds contained in the photoconductive layers of an image display medium as shown in FIG. 1A. FIG. 2 is a graph schematically showing absorption wavelengths of the fulgide compounds contained in the photoconductive layers 7a, 7b, and 7c, respectively when the fulgide compounds are colored.

Next, radiation with wavelengths respectively corresponding to absorption in the visible range of wavelengths of the colored fulgide compounds (Wavelengths A, B, and C in the vicinity of the maximum absorption wavelengths shown in FIG. 2) is applied to desired areas. By this procedure, corresponding specific fulgide compounds are selectively decolorized to yield a desired color image as shown in FIG. 1B.

The two or more fulgide compounds having different maximum absorption wavelengths when the fulgide compounds are colored preferably comprise a fulgide compound (A) having a maximum absorption wavelength of 400 nm or more and less than 500 nm when the fulgide compounds are colored; a fulgide compound (B) having a maximum absorption wavelength of 500 nm or more and less than 600 nm when the fulgide compounds are colored; and a fulgide compound (C) having a maximum absorption wavelength of 600 nm or more and less than 700 nm when the fulgide compounds are colored. Such fulgide compounds having these maximum absorption wavelengths show colors to be seen when the fulgide compounds are colored substantially corresponding to yellow, magenta, and cyan and can thereby constitute the three primary colors.

Examples of the fulgide compound (A) include

2-[1-(4-acetyl-2,5-dimethyl-3-furyl)ethylidene]-3-isopropylidenesuccinic anhydride, 2-[1-(5-methyl-2-phenyl-4-oxazolyl)ethylidene]-3-isopropylidenesuccinic anhydride, and the like.

Examples of the fulgide compound (B) include
2-[1-(2,5-dimethyl-1-phenylpyrazolyl)ethylidene]-3-isopropylidenes uccinic anhydride,
2-[1-(3-methoxy-5-methyl-1-phenyl-4-pyrazolyl)ethylidene]-3-isopropylidenesuccinic anhydride, and the like.

Examples of the fulgide compound (C) include
2-[1-(1,2,5-trimethyl-3-pyrrolyl)ethylidene]-3-isopropylidenesuccinic anhydride,
2-[2,6-dimethyl-3,5-bis(p-dimethylaminostyryl)benzylidene]-3-isopropylidenesuccinic anhydride, and the like.

The aforementioned process for forming multicolor images can control densities of colors of the fulgide compounds by controlling the magnitudes of decolorization of the fulgide compounds. Thus, the process can form multicolor images with wider color reproduction ranges than conventional equivalents. To apply plural rays of visible radiation with plural wavelengths regions to one area of the image display medium after being colored, these rays may be applied either simultaneously or subsequently. In the latter case, the rays can be applied in any order.

The photoconductive layer comprises the electron accepting compound and can thereby form images by controlling the color sensitivity by the application of the image forming process, in which the decolorization sensitivity of the fulgide compounds is temporarily increased upon formation of images and is decreased after the formation of images. Thus, the image display medium and the image forming process can shorten the time period for image formation and can improve persistence of coloring stability of formed images.

Alternatively, the photoconductive layer of the image display medium may be an assemblage comprising a first photoconductive layer containing the fulgide compound (A) and an electron accepting compound, a second photoconductive layer containing the fulgide compound (B) and another electron accepting compound, and a third photoconductive layer containing the fulgide compound (C) and another electron accepting compound.

In the aforementioned image display medium comprising the fulgide compounds (A), (B), and (C) and one electron accepting compound substantially uniformly contained in the photoconductive layer, changes of the decolorization sensitivity caused by the interaction between the acidic group moieties of the electron accepting compound and the aromatic ring moieties of the fulgide compounds may vary depending on the electronic properties of the aromatic ring moieties of the individual fulgide compounds. Specifically, the fulgide compounds may show different changes in decolorization sensitivity due to different electron donating properties of the aromatic ring moieties of the fulgide compounds.

To avoid this, different electron accepting compounds to yield appropriate interactions with the fulgide compounds are selected, respectively, first, second, and third photoconductive layers are formed using, where necessary, a binder material and are laminated to yield an image display medium. By this configuration, changes in the decolorization sensitivity of even the fulgide compounds (A), (B), and (C) having different electronic properties of their aromatic ring moieties can be controlled to the substantially same extent, or the changes in decolorization sensitivity of the fulgide compounds can be optionally controlled independently.

An index of the selection of a combination of a fulgide compound and an electron accepting compound in view of the magnitudes of their interaction is magnitudes of the electron donating property of the aromatic ring moiety of the fulgide compound and of the electron accepting property of the acidic group moiety of the electron accepting compound. In general, the degree of changes in decolorization sensitivity increases with the increasing two magnitudes and decreases with the decreasing two magnitudes.

The photoconductive layer assemblage preferably further comprises intermediate layers between the first and second photoconductive layers and between the second and third photoconductive layers. The components of the adjacent two layers may be mixed in the vicinity of the interface between the two layers in some processes for the formation of the assemblage. By disposing the intermediate layers, the mixing of the components can be avoided, and the photoconductive layer assemblage comprising the individual photoconductive layers with set changes in decolorization sensitivity can be obtained.

Materials for the formation of the intermediate layers are preferably transparent or slightly colored and have some resistance to an organic solvent used in a coating process, which are preferably employed for the formation of the photoconductive layer. Such preferred materials include, for example, silicone resins, and poly vinylalcohol (PVA). A procedure for forming the intermediate layers is not specifically limited as in the photoconductive layer. The proffered is coating, as it is simple.

The image display media of the present invention may further comprise a protecting layer on a surface of the photoconductive layer. The protecting layer can prevent the functions of the compounds in the photoconductive layer from deteriorating, can effectively protect the image display media from mechanical damage and can thereby improve the durability of the image display media.

Preferred materials for forming the protecting layer are silicone resins, acrylic resins, poly(vinyl alcohol), and the like, for their high transparency and hardness.

(Multicolor Image-forming Apparatus)

An image display medium for use in the multicolor image-forming apparatus of the present invention are image display media each comprising a photoconductive layer containing at least one photochromic compound disposed on a substrate. Examples of the image display media are image display media each comprising a substrate and a photoconductive layer disposed on the substrate, which photoconductive layer comprises two or more photochromic compounds having different maximum absorption wavelengths when the fulgide compounds are colored and at least one electron accepting compound. The image display media are preferably the image display media of the present invention.

Such an image display medium is subjected to: a step for applying ultraviolet radiation to the image display medium to thereby color of all photochromic compounds contained in the photoconductive layer; a first heating step for heating the image display medium to a melting point of the electron accepting compound or higher; a process for applying visible radiation having a wavelength corresponding to the maximum absorption wavelength of at least one of the colored photochromic compounds to thereby selectively decolorize the at least one photochromic compound; and a second heating step for heating the image display medium to the melting point of the electron accepting compound or lower. Thus, the decolorization sensitivity can be controlled. In other words, the decolorization sensitivity of the photochromic compounds can be temporarily increased during the formation of images and can be decreased after the formation of images.

The image display media for use in the present invention, which comprise the photoconductive layer comprising the photochromic compounds disposed on the substrate, can form images by the process for forming an image, with changing the decolorization sensitivity. The multicolor image-forming apparatus of the present invention, which forms images on the image display medium, will be described with reference to the drawings.

Figure 3:
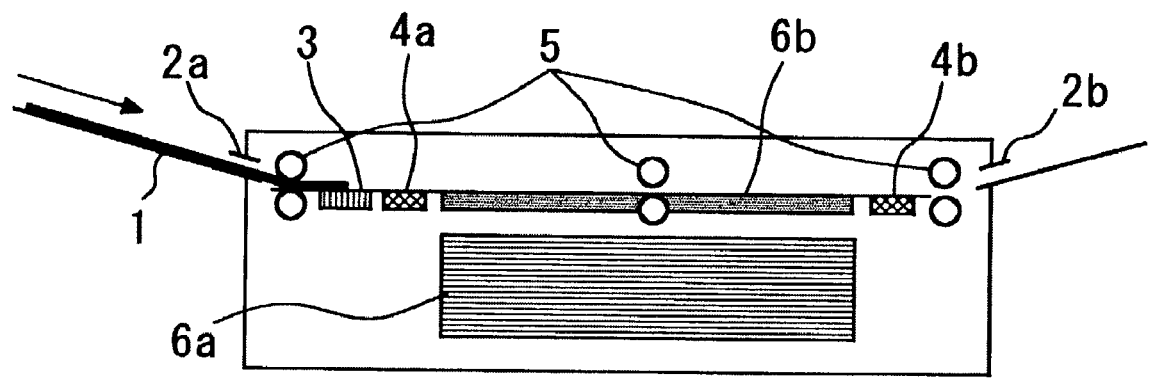
FIG. 3 is a schematic view showing an example of a multicolor image-forming apparatus of the present invention.

FIG. 3 is a schematic view showing an example of the multicolor image-forming apparatus of the present invention.

The multicolor image-forming apparatus of the present invention is an apparatus to form a color image on the image display medium 1. The multicolor image-forming apparatus accommodates an ultraviolet radiation irradiator 3 configured to irradiate ultraviolet radiation so as to color all types of photochromic compounds in a photoconductive layer, a first heater 4a configured to temporarily heat the image display medium, a visible radiation irradiator 6 configured to irradiate visible radiation to the photochromic compounds, at a wavelength corresponding to the maximum absorption wavelength of the photochromic compounds so as to selectively decolorize the photochromic compounds, and a second heater 4b configured to temporarily heat the image display medium after irradiating the visible radiation.

Examples of the ultraviolet radiation irradiator 3 configured to irradiate ultraviolet radiation includes, for example, an ultraviolet (UV) lamp, ultraviolet radiation having a suitable wavelength, and the like. Of those, the ultraviolet radiation having a suitable wavelength is obtained by combining an optical filter with a mercury lamp, a xenon lamp, or the like.

The examples further include light-emitting device that irradiates radiation with a specific wavelength, such as an LED.

Examples of the first heater 4a include heaters such as heat rollers, thermal heads, halogen heaters, ceramic heaters, silica tube heaters, and the like. The first heater 4a is controlled so that the photoconductive layer is temporarily heated to Temperature I, which is equal to or higher than the melting point of the electron accepting compound, to thereby enable the image display medium 1 to be in State A.

Examples of the visible radiation irradiator 6 include light sources 6a such as lamps and LEDs emitting light in wavelengths corresponding to the absorption wavelengths of the visible range of the photochromic compounds when the photochromic compounds are colored, and two-dimensional light modulation elements 6b that can control transmission or reflection of visible radiation in a size corresponding to each pixel of an image to be formed, such as liquid crystal display panels and digital micro mirror devices (Dads). Such lamps can be used in combination with optical filters. A system can also be employed as the visible radiation irradiators 6, in which a beam of laser light or LED having an irradiation spot corresponding to each pixel of the target image is applied to the image display medium 1 while relatively moving.

Each of the colored photochromic compounds in the image display medium 1 can be selectively decolorized by the visible radiation irradiator 6 as shown in FIG. 1B.

Examples of the second heater 4b are heat rollers, thermal heads, halogen heaters, ceramic heaters, silica tube heaters, and other heaters as in the first heater 4a. The second heater 4b is controlled so that the photoconductive layer is temporarily heated to Temperature II which is equal to or lower than the melting point of the electron accepting compound to thereby enable the image display medium 1 to be in State B.

The multicolor image-forming apparatus may comprise a heater or a device serving both as the first heater 4a configured to temporarily heat the colored image display medium 1, and the second heater 4b configured to temporarily heat the image display medium after irradiating the visible radiation. In this case, the apparatus requires a system or a mechanism for switching temperatures so as to enable the heating procedures at different appropriate temperatures in the first and second heating steps.

In the formation of color images by the four steps, the image display medium 1 is required to be moved to an appropriate position of each of the irradiators and the heaters at each of the steps. In addition, it is required that the steps be carried out by changing or adjusting the position at each of the steps, except for a constitution where the image display medium goes through all of the steps at once.

The multicolor image-forming apparatus of the present invention may further comprise a transfer 5 for the image display medium 1. The transfer 5 moves the image display medium 1 relatively to the ultraviolet radiation irradiator 3, the first heater 4a, the visible radiation irradiator 6, and the second heater 4b, in this order. Herein, moving the image display medium "relatively" means a case where the transfer 5 moves the image display medium 1, or a case where the heaters and the irradiators move the image display medium. The "moving the image display medium relatively" further includes both of the cases. Thus, the apparatus can automatically move the image display medium 1 among the irradiators and the heaters used in the steps, and can control the position of the image display medium 1 according to necessity in the steps.

Alternatively, the transfer 5 for the image display medium 1 may serve so as to transfer the image display medium 1 with respect to the ultraviolet radiation irradiator 3, the heater 4, and the visible radiation irradiator 6 in this order, and then to transfer the image display medium 1 again to the heater 4 to thereby form images.

More specifically, one heater is used both as the first heater 4a and the second heater 4b, and the heating temperature of the heater is switched between the first heater and the second heater.

By using a heater as both of the two heaters, the apparatus can reduce its cost and size.

As the transfer 5, for example, a transport roller of roller structure made of a rubber material used in, for example, copiers and printers can be used.

The multicolor image-forming apparatus of the present invention may further comprise an inlet 2a and an outlet 2b for the image display medium 1. The inlet 2a and the outlet 2b are capable of automatically transferring the image display medium 1 inside the apparatus, the image display medium 1 inserted into the apparatus through the inlet 2a, subjecting the image display medium 1 to image forming procedures by the processes, and ejecting it from the apparatus through the outlet 2b. By this configuration, the apparatus increases its user friendliness and can reliably carry out the treatments in the processes.

Alternatively, the apparatus may comprise one inlet/outlet port 2, which is capable of automatically transporting the image display medium 1 inserted into the apparatus through the inlet/outlet port 2, subjecting the image display medium 1 to image forming procedures by the processes, and ejecting it from the apparatus through the inlet/outlet port 2. By this configuration, the apparatus further increases its user friendliness and can be further miniaturized.

The multicolor image-forming apparatus on the image display medium of the present invention may further comprise a white radiation irradiator to decolorize the entire image display medium.

Figure 5:
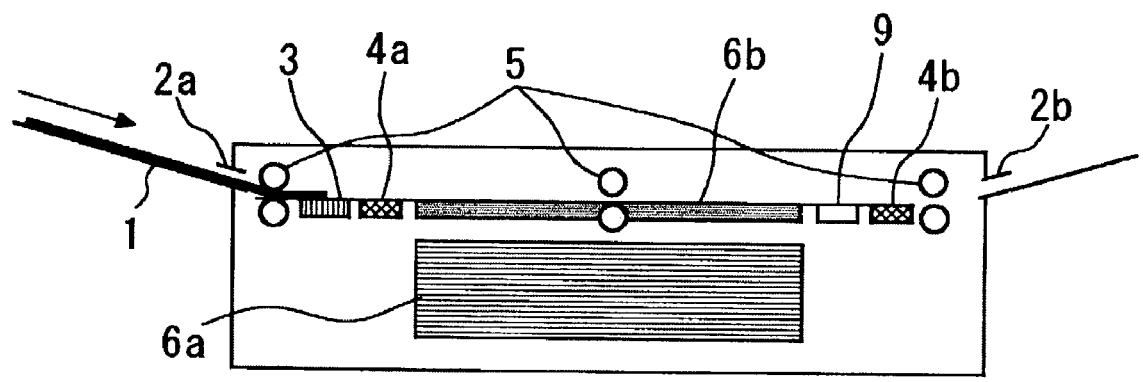
FIG. 5 is a schematic view showing an example of a multicolor image-forming apparatus of the present invention, which has a white radiation irradiator.

FIG. 5 is a schematic view of the multicolor image-forming apparatus of the present invention, which further includes a white radiation irradiator 9.

To form another image on an image display medium already carrying an image, the multicolor image-forming apparatus of the present invention can repeatedly directly form such another image in the image display medium without extra decolorizing procedure. However, to decolorize the entire image display medium, the apparatus may further include the white radiation irradiator 9 in addition to the visible radiation irradiator used in the step of selectively decolorizing and irradiates white radiation to the entire image display medium, so as to decolorize the entire image display medium in a short time.

Figure 6:
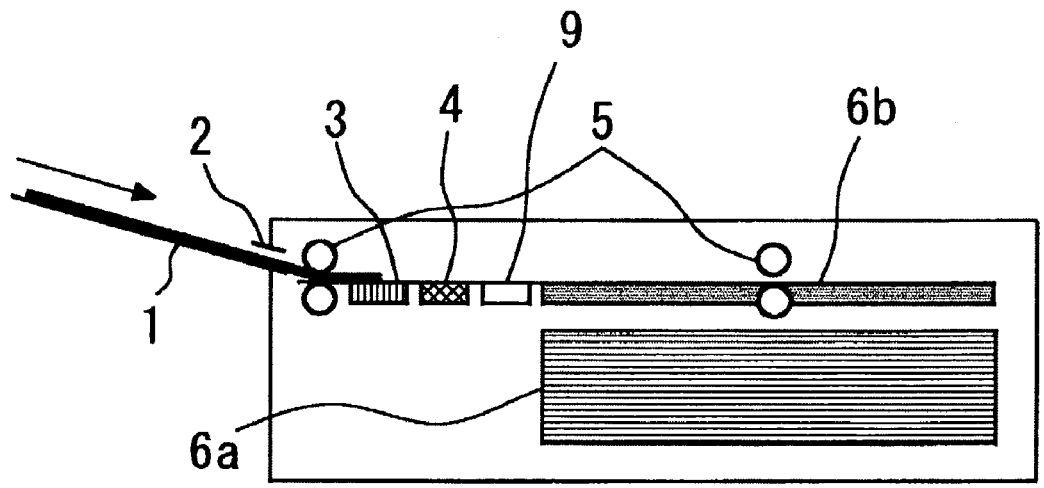
FIG. 6 is a schematic view showing an example of a multicolor image-forming apparatus of the present invention, which has an inlet/outlet port and a white radiation irradiator.

The white radiation irradiator 9 can be disposed at such a position as shown in FIG. 6 in the apparatus including the inlet/outlet port 2, but its position is not specifically limited.

EXAMPLES

The present invention will be described in further detail with reference to several examples below, which are not intended to limit the scope of the present invention.

Example A-1

A coating solution was prepared by using 20 parts by weight of
2-[1-(5-methyl-2-p-dimethylaminophenyl-4-oxazolyl)ethylidene]-3-isopropylidenesuccinic anhydride (hereinafter briefly referred to as "PC 2") as a photochromic compound, 30 parts by weight of tetradecylphosphonic acid as an electron accepting compound, 50 parts by weight of polystyrene as a binder, and an appropriate amount of toluene as a solvent. The coating solution was applied to a quartz substrate and thereby yielded a cast film.

The cast film was temporarily heated to 80° C. using a heat roller. An absorption spectrum of the heated cast film before irradiation with light was determined to find that the film showed absorption in ranges from 300 nm to a little under 400 nm with a maximum absorption wavelength of 320 nm and was colorless.

The film was then irradiated with ultraviolet radiation of 366 nm extracted from a high pressure mercury lamp and thereby turned magenta with maximum absorption wavelength of 525 nm in its absorption spectrum. The film was temporarily heated to 170° C. using the heat roller and thereby changed its color to reddish with maximum absorption wavelength of 485 nm in its absorption spectrum.

The film was then temporarily heated to 80° C. using the heat roller and thereby turned magenta again with maximum absorption wavelength of 525 nm in its absorption spectrum.

Next, a cast film having the same composition as above was formed on a white poly(ethylene terephthalate) (PET) substrate 188 μm thick, a PVA film 2 μm thick was formed thereon as a protecting layer and thereby yielded an image display medium. The thus-prepared photoconductive layer was colorless and was formed on the white substrate, and the resulting image display medium was seen white by a viewer.

Figure 7:
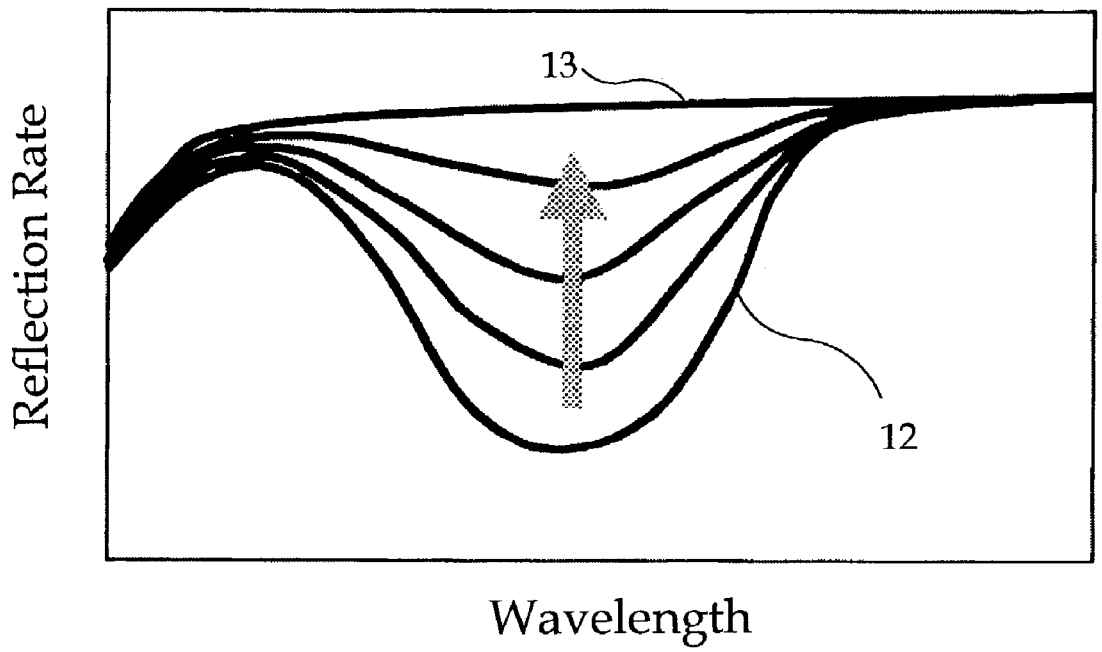
FIG. 7 is a graph showing an example of changes in reflection with time, in which visible radiation is irradiated.
Figure 8:
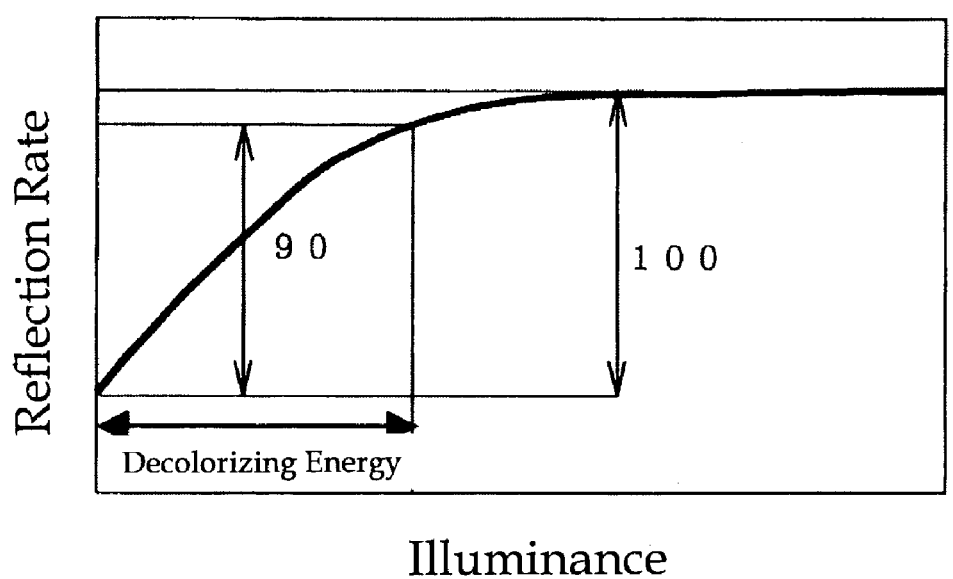
FIG. 8 is a graph showing an example of changes in reflection ratio at a bottom wavelength.

The photoconductive layer of the image display medium was temporarily heated to 80° C. using a heat roller, was irradiated with ultraviolet radiation of 366 nm to thereby saturate a color reaction and was irradiated with visible radiation with a center wavelength of 520 nm and a half-width of 10 nm at an illuminance of 1 mW/cm$^2$ for decolorization. In this procedure, an irradiation time period of the visible radiation was changed, and changes in reflection spectra were determined. FIG. 7 is a view showing an example of changes in reflection spectrum with irradiation time. The reflection spectrum changed with irradiation time period of the visible radiation from saturated colored state 12 to saturated decolorized state 13. In FIG. 7, the arrow means a direction from a short irradiation time period to a long one. Next, an illuminance was calculated from the irradiation time period of the visible radiation to thereby determine the relationship between the illuminance and the reflection ratio. FIG. 8 is a graph showing the relationship between the illuminance and the reflection ratio at a bottom wavelength. An illuminance to make the change in reflection ratio at the bottom wavelength 90% or more of the total changes was determined based on FIG. 7 and was found to be about 1500 mJ/cm$^2$. The thus-determined illuminance was defined as the decolorizing energy as an index of the decolorization sensitivity.

The photoconductive layer of the image display medium was irradiated again with ultraviolet radiation of 366 nm to thereby saturate a color reaction, was temporarily heated to 170° C. using the heat roller, and was irradiated with visible radiation with a center wavelength of 480 nm and a half-width of 10 nm at an illuminance of 1 mW/cm$^2$. The decolorizing energy in this procedure was determined in the same manner as above and was found to be 20 mJ/cm$^2$. The photoconductive layer of the image display medium was irradiated again with ultraviolet radiation of 366 nm to thereby saturate a color reaction, was temporarily heated to 80° C. using the heat roller, and was irradiated with visible radiation with a center wavelength of 520 nm and a half-width of 10 nm at an illuminance of 1 mW/cm$^2$. The decolorizing energy in this procedure was determined in the same manner as above and was found to be about 1500 mJ/cm$^2$.

These results verify that the decolorization sensitivity can be reversibly changed by incorporating a phosphonic acid compound having an aliphatic group containing 12 or more carbon atoms as the electron accepting compound into the photoconductive layer.

Example A-2

An image display medium was prepared by the procedure of Example A-1, except that 40 parts by weight of alpha-hydroxytetradecanoic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1, and the energy after temporarily heating to 170° C. was 33 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-3

An image display medium was prepared by the procedure of Example A-1, except that 40 parts by weight of 2-fluorooctadecanoic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 35 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer with.

Example A-4

An image display medium was prepared by the procedure of Example A-1, except that 40 parts by weight of 2-oxooctadecanoic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 35 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-5

An image display medium was prepared by the procedure of Example A-1, except that 40 parts by weight of 2-(octadecylthio)succinic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 22 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-6

An image display medium was prepared by the procedure of Example A-1, except that 40 parts by weight of octadecylsuccinic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 33 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-7

An image display medium was prepared by the procedure of Example A-1, except that 40 parts by weight of octadecylmalonic acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 28 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-8

An image display medium was prepared by the procedure of Example A-1, except that 40 parts by weight of 2-octadecylglutaric acid as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 30 mJ/cm$^2$.

These results verify that the decolorization sensitivity can be reversibly changed by incorporating a carboxylic acid compound having an aliphatic group containing 12 or more carbon atoms as the electron accepting compound into the photoconductive layer.

Example A-9

An image display medium was prepared by the procedure of Example A-1, except that 40 parts by weight of p-(octadecylthio)phenol as the electron accepting compound, 40 parts by weight of polystyrene, and 20 parts by weight of PC 2 were used. The image display medium was subjected to heat treatments and its decolorizing energy was determined by the procedures of Example A-1. The decolorizing energy after temporarily heating to 80° C. was about 1500 mJ/cm$^2$ as in Example A-1 and that after temporarily heating to 170° C. was 40 mJ/cm$^2$.

These results verify that the decolorization sensitivity can be reversibly changed by incorporating a phenolic compound having an aliphatic group containing 12 or more carbon atoms as the electron accepting compound into the photoconductive layer.

Example A-10

As photochromic compounds,
2-[1-(5-methyl-2-phenyl-4-oxazolyl)ethylidene]-3-isopropylidenesuccinic anhydride (hereinafter briefly referred to as "PC 1"), PC 2, and 2-[1-(1,2,5-trimethyl-3-pyrrolyl)ethylidene]-3-isopropylidenesuccinic anhydride (hereinafter briefly referred to as "PC 3") were used. A coating solution was prepared on a quartz substrate using 30 parts by weight of PC 1, 30 parts by weight of tetradecylphosphonic acid as an electron accepting compound, 40 parts by weight of polystyrene as a binder, and an appropriate amount of toluene as a solvent, and a cast film was prepared on a quartz substrate using the coating solution. Two cast films using PC 2 and PC 3 instead of PC 1, respectively, were formed on a quartz substrate in the same manner as above.

These cast films were temporarily heated to 80° C. using a heat roller. The absorption spectra of the cast films using PC 1, PC 2, or PC 3 before irradiation with light were determined to find that they showed absorption in ranges from 300 nm to a little below 400 nm with maximum absorption wavelengths of 337 nm, 320 nm, and 360 nm, respectively, and were colorless.

The cast films prepared using PC 1, PC 2 or PC 3 were irradiated with ultraviolet radiation of 366 nm extracted from a high pressure mercury lamp, turned yellow, magenta, and cyan with maximum absorption wavelengths of 450 nm, 525 nm, and 660 nm, respectively.

These cast films were temporarily heated to 170° C. using the heat roller, turned colors with maximum absorption wavelengths in absorption spectra of 420 nm, 485 nm, and 620 nm, respectively. The cast films were then temporarily heated to 80° C. using the heat roller and turned back colors with maximum absorption wavelengths in absorption spectra of 450 nm, 525 nm, and 660 nm, respectively.

A coating solution was prepared by using 10 parts by weight of PC 1, 10 parts by weight of PC 2, 10 parts by weight of PC 3, 30 parts by weight of tetradecylphosphonic acid, 40 parts by weight of polystyrene, and an appropriate amount of toluene as a solvent. A cast film was formed on a 188 μm thick white poly ethyleneterephthalate (PET) substrate using the coating solution, a 2 μm thick PVA film was formed thereon as a protecting layer. The thus-prepared photoconductive layer was colorless and was formed on the white substrate, and the resulting image display medium was seen white by a viewer.

The photoconductive layer of the image display medium was temporarily heated to 80° C. using a heat roller and was irradiated with ultraviolet radiation of 366 nm. Thus, all of the PC 1, PC 2 and PC 3 colored, and the image display medium turned black. The photoconductive layer was then irradiated with white radiation, became transparent with no color again, and the resulting image display medium was seen white by a viewer.

The image display medium was irradiated with ultraviolet radiation of 366 nm again, a part of which was then irradiated with visible radiation with a center wavelength of 450 nm and a half-width of 10 nm. Thus, PC 1 in an irradiated portion was selectively decolorized, and the irradiated portion turned blue. Another portion of the image display medium was irradiated with visible radiation with a center wavelength of 520 nm and a half-width of 10 nm to thereby selectively decolorize PC 2 and turned green. Yet another portion of the image display medium was irradiated with visible radiation with a center wavelength of 660 nm and a half-width of 10 nm to thereby selectively decolorize PC 3 and turned red.

The decolorizing energy of PC 1, PC 2, and PC 3 was determined in unexposed portions to the visible radiation using visible radiation of the three wavelengths distributions in the same manner as in Example A-1 and was found to be 580 mJ/cm$^2$, 1050 mJ/cm$^2$, and 790 mJ/cm$^2$, respectively.

The photoconductive layer of the image display medium was irradiated with ultraviolet radiation of 366 nm again to thereby saturate a color reaction and was temporarily heated to 170° C. using the heat roller. The decolorizing energy of PC 1, PC 2, and PC 3 was determined using visible radiation of 420 nm, 480 nm, and 620 nm in the same manner as above and was found to be 20 mJ/cm$^2$, 33 mJ/cm$^2$, and 26 mJ/cm$^2$, respectively. Thereafter, the photoconductive layer of the image display medium was irradiated with ultraviolet radiation of 366 nm again to thereby saturate a color reaction and was temporarily heated to 80° C. using the heat roller. The decolorizing energy of PC 1, PC 2, and PC 3 was determined in the same manner as above and was found to be 580 mJ/cm$^2$, 1050 mJ/cm$^2$, and 790 mJ/cm$^2$, respectively.

These results verify that the decolorizing energy of individual photochromic compounds can be reversibly largely changed by simple heating procedures even in an image display medium having a photoconductive layer using three photochromic compounds.

Example A-11

An image display medium was prepared in the following manner. A cast film was formed on a white PET substrate 188 μm thick using a coating solution containing 30 parts by weight of PC 1, 30 parts by weight of p-(octadecylthio) phenol, 40 parts by weight of polystyrene, and an appropriate amount of toluene as a solvent; a PVA intermediate layer was formed thereon; another cast film was formed thereon using a coating solution containing 30 parts by weight of PC 2, 30 parts by weight of tetradecylphosphonic acid, 40 parts by weight of polystyrene, and an appropriate amount of toluene as a solvent; a PVA intermediate layer was formed thereon; yet another cast film was formed thereon using a coating solution containing 30 parts by weight of PC 3, 30 parts by weight of 2-octadecylglutaric acid, 40 parts by weight of polystyrene, and an appropriate amount of toluene as a solvent; a PVA protective film was formed thereon and thereby yielded an image display medium. The thus-prepared photoconductive layer was colorless, was formed on the white substrate, and the resulting image display medium was seen white by a viewer.

The photoconductive layer of the image display medium was temporarily heated to 80° C. using a heat roller and was irradiated with ultraviolet radiation of 366 nm. Thus, all PC 1, PC 2, and PC 3 colored and the image display medium turned black. The photoconductive layer was then irradiated with white radiation, became transparent and colorless again, and the resulting image display medium was seen white by a viewer.

The image display medium was irradiated with ultraviolet radiation of 366 nm again, a part of which was then irradiated with visible radiation with a center wavelength of 450 nm and a half-width of 10 nm. Thus, PC 1 in an irradiated portion was selectively decolorized, and the irradiated portion turned blue. Another portion of the image display medium was irradiated with visible radiation with a center wavelength of 520 nm and a half-width of 10 nm to selectively decolorize PC 2 and thereby turned green. Yet another portion of the image display medium was irradiated with visible radiation with a center wavelength of 660 nm and a half-width of 10 nm to selectively decolorize PC 3 and thereby turned red.

The decolorizing energy of PC 1, PC 2, and PC 3 was determined in unexposed portions to the visible radiation using visible radiation of the three wavelengths distributions in the same manner as in Example A-1 and was found to be 580 mJ/cm$^2$, 1050 mJ/cm$^2$, and 790 mJ/cm$^2$, respectively.

The photoconductive layer of the image display medium was irradiated with ultraviolet radiation of 366 nm again to thereby saturate a color reaction and was temporarily heated to 170° C. using the heat roller. The decolorizing energy of PC 1, PC 2, and PC 3 was determined using visible radiation with center wavelengths of 430 nm, 500 nm, and 630 nm in the same manner as above and was found to be 30 mJ/cm$^2$, 33 mJ/cm$^2$, and 32 mJ/cm$^2$, respectively. Thereafter, the photoconductive layer of the image display medium was irradiated with ultraviolet radiation of 366 nm again to thereby saturate a color reaction and was temporarily heated to 80° C. using the heat roller. The decolorizing energy of PC 1, PC 2, and PC 3 was determined in the same manner as above and was found to be 580 mJ/cm$^2$, 1050 mJ/cm$^2$, and 790 mJ/cm$^2$, respectively.

These results verify that the decolorizing sensitivities of three photochromic compounds can be controlled at a substantially equal level as in the present example, by forming three photoconductive layers containing three different combinations of the photochromic compounds with corresponding electron accepting compounds, respectively.

As described above, the present invention can provide image display media and processes for forming images that are rewritable upon irradiation with light, which media and processes can shorten the time period for image formation and can improve persistence of coloring stability of formed images.

Example B-1

An multicolor image-forming apparatus having the configuration shown in FIG. 3 was prepared as an apparatus for forming images on an image display medium as obtained in Example A-11. The image display medium can change its decolorization sensitivity by a heat treatment.

Figure 9:
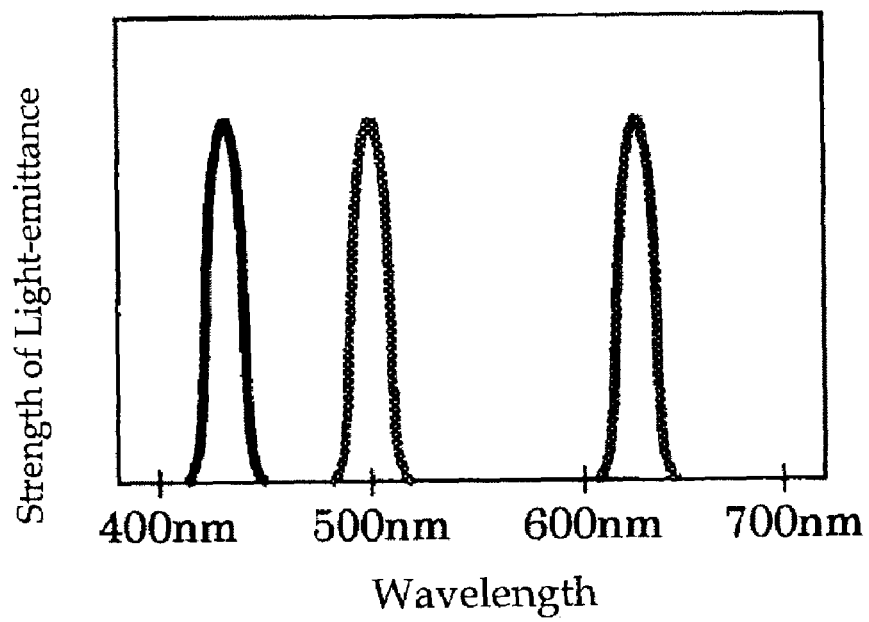
FIG. 9 is a graph showing an example of light-emitting properties at wavelengths of a visible radiation irradiator used in the examples.
Figure 10:
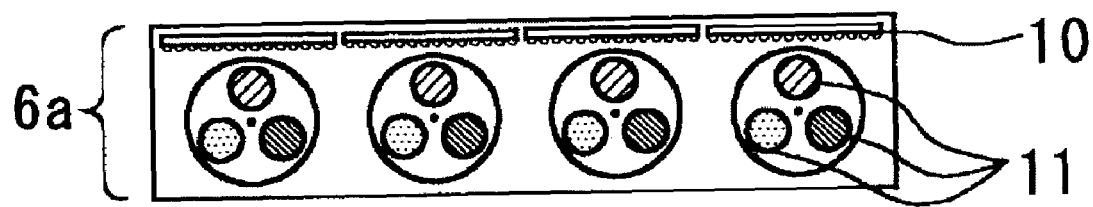
FIG. 10 is a schematic view showing an example of the visible radiation irradiator used in the examples.

The apparatus included a black light with a center wavelength in light emission of 360 nm as the ultraviolet radiation irradiator; ceramic line heaters as the heaters with set heating temperatures of 170° C. and 80° C., respectively; a liquid crystal panel (768×10$^{24}$ pixels) as the two-dimensional optical modulator; and three straight-tube light sources 11 shown in FIG. 10 with center wavelengths in light emission of 430 nm, 500 nm, and 630 nm, respectively, as the visible radiation irradiator. The light sources 11 had wavelength properties in light emission as shown in FIG. 9. The apparatus further included a mechanism for switching the positions of the light sources 11 by rotation and a light integrator 10 for uniformizing the illuminance in the two-dimensional optical modulator.

In this apparatus, an image display medium inserted into the apparatus through the inlet is transported to a set position on the two-dimensional optical modulator at a set speed. During the transportation, the image display medium is sequentially subjected to a color development process by irradiation with ultraviolet radiation and a changing (increasing) process of the decolorization sensitivity by the first heater. While operating the two-dimensional optical modulator according to input image data, the three visible radiation light sources are sequentially switched to subject the image display medium to a decolorizing process by irradiation with visible radiation to thereby form a color image. The image display medium is then transported to the outlet while subjecting the same to changing (decreasing) of the decolorization sensitivity by the second heater and is ejected from the apparatus through the outlet.

Using this apparatus, a color image was formed on the image display medium according to Example A-11 at a transport speed of 50 mm/sec and an illumination time period of the visible radiation irradiator per one light source of 7 seconds and thereby yielded a clear color image. It took about 30 seconds to perform all the processes. The image display medium carrying the thus-formed image was inserted into the inlet of the apparatus again, another image was input to write the image on the medium and thereby yielded a new image without any problem.

Comparative Example B-1

An apparatus having the same configuration as the multicolor image-forming apparatus in Example B-1, excluding the first and second heater, was prepared. Using the apparatus, a color image was formed on an image display medium by the procedure of Example B-1. However, the decolorizing process by irradiation with visible radiation was not performed sufficiently under the same conditions as in Example B-1, and the apparatus failed to form a sharp color image. To form a sharp color image using this apparatus, it took four minutes or more to decolorize the image display medium by irradiation with visible light.

Example B-2

Figure 4:
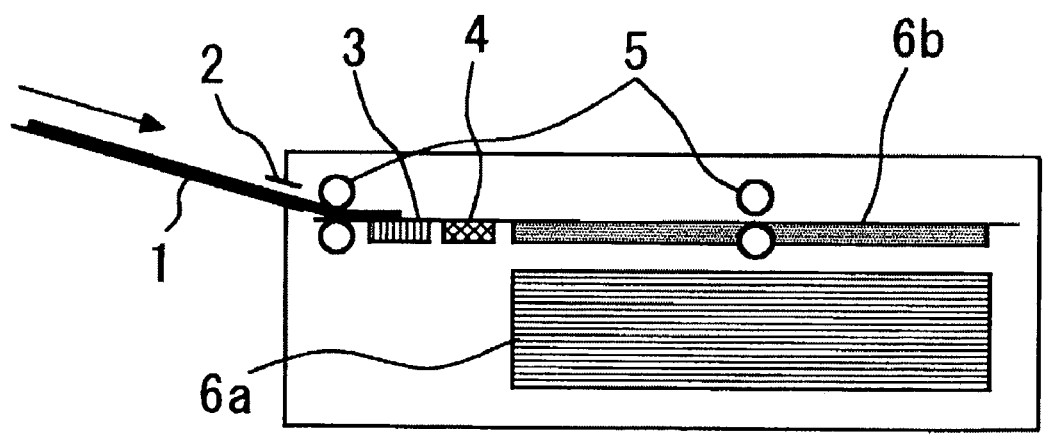
FIG. 4 is a schematic view showing an example of a multicolor image-forming apparatus of the present invention, which has an inlet/outlet port.

An multicolor image-forming apparatus having the configuration shown in FIG. 4 was prepared. The apparatus included one heater serving both as the first and second heater in the apparatus according to Example B-1 and was capable of switching the heating temperature between 170° C. and 80° C. The apparatus included the same ultraviolet radiation irradiator and the visible radiation irradiator as in Example B-1. The apparatus served to perform the same processes until the decolorizing process by irradiation with visible radiation as in Example B-1, but served to transport the image display medium in an opposite direction, to switch (decrease) the decolorization sensitivity by the heater with a heating temperature set at 80° C. and to eject the medium from the apparatus through the inlet/outlet port. This apparatus can reduce its size and cost as compared with the apparatus according to Example B-1. Using the apparatus, a sharp color image could be formed on an image display medium as in Example B-1.

Example B-3

An multicolor image-forming apparatus having the configuration shown in FIG. 5 was prepared. The resulting apparatus further included a white radiation irradiator in addition to the configuration of the apparatus according to Example B-1. The apparatus could erase an entire image of an image display medium carrying the formed image in a short time while continuously transporting the medium from the inlet. In this procedure, the apparatus did not require a decolorizing process by the visible radiation irradiator and thereby did not stop the transport of the image display medium at the position of the visible radiation irradiator.

Example B-4

An multicolor image-forming apparatus having the configuration shown in FIG. 6 was prepared. The resulting apparatus further included a white radiation irradiator in addition to the configuration of the apparatus according to Example B-2. The apparatus could erase an entire image of an image display medium carrying the formed image in a short time while continuously transporting the medium from the inlet. In this procedure, the apparatus did not require a decolorizing process by the visible radiation irradiator and thereby did not stop the transport of the image display medium at the position of the visible radiation irradiator.

As is described above, the present invention can provide the multicolor image-forming apparatus, which can control its decolorization sensitivity, can shorten the image forming time period and can ensure the persistence of coloring stability of formed images.

What is claimed is:

1. An image display medium comprising:
 a photoconductive layer containing a photochromic compound and an electron accepting compound; and
 a substrate,
 wherein the photochromic compound contains a fulgide compound, and the electron accepting compound contains a compound selected at least from:
  a) a phosphonic acid compound having an aliphatic group containing 12 or more carbon atoms;
  b) an aliphatic carboxylic acid compound having an aliphatic group containing 12 or more carbon atoms, wherein said aliphatic carboxylic acid compound is at least one member selected from the group consisting of:
   b-1) an alpha-hydroxyalphaticcarboxylic acid compound represented by the following Formula (II):

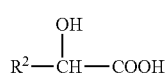

Formula (II)

where $R^2$ is an aliphatic group containing 12 or more carbon atoms,
   b-2) an aliphatic carboxylic acid compound containing 12 or more carbon atoms, and at least one of the carbon atoms is bonded to a halogen element at one of an alpha-position and a beta-position of the aliphatic carboxylic acid compound,
   b-3) an aliphatic carboxylic acid compound containing 12 or more carbon atoms, and the aliphatic carboxylic acid compound has at least one oxo group at any one of an alpha-position, a beta-position, and a gamma-position thereof,
   b-4) an aliphatic carboxylic acid compound represented by the following Formula (III):

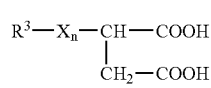

Formula (III)

where $R^3$ is aliphatic group containing 12 or more carbon atoms, "X" is one of an oxygen atom and a sulfur atom; and "n" is 1 when "X" is an oxygen atom, and "n" is one of 1 and 2 when "X" is a sulfur atom,
   b-5) an aliphatic carboxylic acid compound represented by the following Formula (IV):

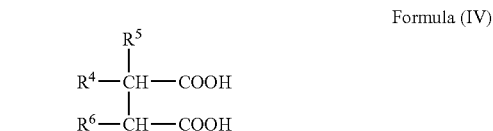

Formula (IV)

where $R^4$, $R^5$, and $R^6$ are identical or different, and each express one of a hydrogen atom and an aliphatic group, in which at least one of $R^4$, $R^5$, and $R^6$ is an aliphatic group containing 12 or more carbon atoms,
   b-6) an aliphatic carboxylic acid compound represented by the following

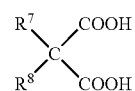

Formula (V)

where $R^7$ and $R^8$ are identical or different, and each express one of a hydrogen atom and an aliphatic group, in which at least one of $R^7$ and $R^8$ is an aliphatic group containing 12 or more carbon atoms, and
   b-7) an aliphatic carboxylic acid compound represented by the following Formula (VI):

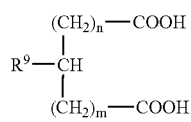

Formula (VI)

where $R^9$ is an aliphatic group containing 12 or more carbon atoms,
   "n" is b 0 or 1, and
   "m" is an integer from 1 to 3, in which "m" is 2 or 3 when "n" is 0, and "m" is 1 or 2 when "n" is 1; and
  c) a phenolic compound having an aliphatic group containing 12 or more carbon atoms.

2. An image display medium according to claim 1, wherein the electron accepting compound is a phosphonic acid compound represented by the following Formula (I);

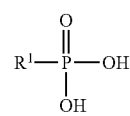

Formula (I)

where $R^1$ is an aliphatic group containing 12 or more carbon atoms.

3. An image display medium according to claim 1, wherein the electron accepting compound is a phenolic compound represented by the following Formula (VII):

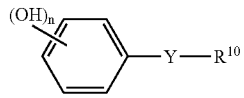

Formula (VII)

where $R^{10}$ is an aliphatic group containing 12 or more carbon atoms;

"Y" is one of S, O, CONH, and COO; and

"n" is an integer from 1 to 3.

4. An image display medium according to claim 1, wherein the photochromic compound contains two or more fulgide compounds having different maximum absorption wavelengths, when the photochromic compound is colored.

5. An image display medium according to claim 4, wherein two or more of the fulgide compounds contain:
   a fulgide compound (A) having a maximum absorption wavelength of 400 nm or more and less than 500 nm, when the photochromic compound is colored;
   a fulgide compound (B) having a maximum absorption wavelength of 500 nm or more and less than 600 nm, when the photochromic compound is colored; and
   a fulgide compound (C) having a maximum absorption wavelength of 600 nm or more and less than 700 nm, when the photochromic compound is colored.

6. An image display medium according to claim 4, wherein the photoconductive layer has a plurality of layers, and each of the layers has fulgide compounds having different maximum absorption wavelengths, when the photochromic compound is colored.

7. An image display medium according to claim 6, wherein the fulgide compounds having different maximum absorption wavelengths when the photochromic compound is colored contains:
   a fulgide compound (A) having a maximum absorption wavelength of 400 nm or more and less than 500 nm when the photochromic compound is colored;
   a fulgide compound (B) having a maximum absorption wavelength of 500 nm or more and less than 600 nm when the photochromic compound is colored; and
   a fulgide compound (C) having a maximum absorption wavelength of 600 nm or more and less than 700 nm when the photochromic compound is colored.

8. An image display medium according to claim 6, wherein the photoconductive layer further has an intermediate layer between a plurality of the layers.

9. An image display medium according to claim 1, further comprising a protecting layer on a surface of the photoconductive layer.

10. A process for forming an image comprising the steps of:
   irradiating ultraviolet radiation to an image display medium so as to color all types of photochromic compounds contained in a photoconductive layer;
   heating the image display medium to a melting point of an electron accepting compound or higher;
   irradiating visible radiation to a desired portion of the image display medium at wavelength corresponding to maximum absorption wavelengths of each of the photochromic compounds in a state of colored, so as to selectively decolorize the photochromic compounds; and
   heating the image display medium to the melting point of the electron accepting compound or lower, wherein the image display medium comprises:
   a photoconductive layer containing photochromic compounds and an electron accepting compound; and
   a substrate,
   wherein the photochromic compounds contain a fulgide compound, and the electron accepting compound contains a compound selected at least from:
     a) a phosphonic acid compound having an aliphatic group containing 12 or more carbon atoms;
     b) an aliphatic carboxylic acid compound having an aliphatic group containing 12 or more carbon atoms; and
     c) a phenolic compound having an aliphatic group containing 12 or more carbon atoms.

11. A process for forming an image according to claim 10, wherein the image display medium is heated at a melting point of the fulgide compound or higher, in the step of heating the image display medium to a melting point of an electron accepting compound or higher.

12. A process for forming an image according to claim 10, further comprising a step of rapidly cooling the image display medium, after the step of heating the image display medium to a melting point of an electron accepting compound or higher.

* * * * *